COMMUNICATIONS ACCUMULATION AND DISTRIBUTION

Filed Oct. 4, 1963 3 Sheets-Sheet 1

INVENTOR.
RONALD S. KLEIN
BY
Carl V. Olson
Attorney

INVENTOR.
RONALD S. KLEIN
BY
Carl V. Olson
Attorney

INVENTOR.
RONALD S. KLEIN
BY Carl V. Olson
Attorney

United States Patent Office 3,293,618

Patented Dec. 20, 1966

3,293,618
COMMUNICATIONS ACCUMULATION AND DISTRIBUTION

Ronald S. Klein, Cherry Hill, N.J., assignor to Radio Corporation of America, a corporation of Delaware

Filed Oct. 4, 1963, Ser. No. 313,808
8 Claims. (Cl. 340—172.5)

This invention relates to computer-controlled communications switching systems, and has for its object the provisions of an improved communications message accumulation and distribution system for transferring intelligence characters between a plurality of input and output line buffers and a corresponding plurality of message storage zones in a message storage memory.

A feature of the invention is an arrangement wherein each procedure word stored in a procedure memory for controlling data characters from a respective input or output line buffer includes the address in the procedure memory of the procedure word associated with the next line buffer to be serviced. This gives the system greater flexibility in use because the sequence and frequency of servicing of line buffers can be readily adapted to changed system conditions by merely changing the address information stored in the procedure memory.

Another feature of the invention is an arrangement wherein data characters passing through the system are code converted by addressing a code conversion memory storing words including corresponding characters in a plurality of different codes together with a functional machine instruction. The machine instruction is decoded to control the handling of the code converted character. The arrangement gives the system greater flexibility in use because messages in new or different codes can be accommodated without any hardware changes by merely changing the contents of the code conversion memory.

According to one specific example of the invention, a communications accumulation and distribution unit transfers data characters between a plurality of input and output line buffers and a corresponding plurality of message storage zones in a message storage memory. The unit includes a procedure memory having addresses (identifying respective input and output line buffers) for corresponding procedure word storage locations. Each of the procedure words includes the address of the procedure word of the next line buffer to be serviced, procedure and status tally information, and a message storage memory address. Means are provided to cyclically address all of the procedure word locations using the address of the next procedure word in each procedure word for determining the next procedure word addressed. A code conversion memory is provided having addresses (identifying characters in various character codes) for corresponding conversion word storage locations containing equivalent characters in other codes together with associated machine instructions. A procedure register and a conversion register are connected to receive information read from said procedure and conversion memories, respectively. The line buffer address and message memory address contents of the procedure register is used to address a line buffer and a word location in the message storage memory. A first decoder means is responsive to the tally contents of the procedure register to condition a character signal path from the input line buffers or an addressed location in the message storage memory to the address input of the conversion memory, and to condition a character signal path from the conversion memory to the conversion register for a code converted character in one selected code and an associated machine instruction. A second decoder means decodes the machine instruction portion of the contents of the conversion register to condition a character signal path from the character portion of the conversion register to the addressed location in the message storage memory or to the output line buffers. Means are also provided to modify and update the tally and message storage memory address contents of the procedure register and write it back into the procedure memory.

In the drawings:

FIG. 1A is a diagram of an additional connected part of the system of FIG. 1 for controlling access to the system of FIG. 1 by a communications data processor;

*Description—General organization of system*

Figure 1:
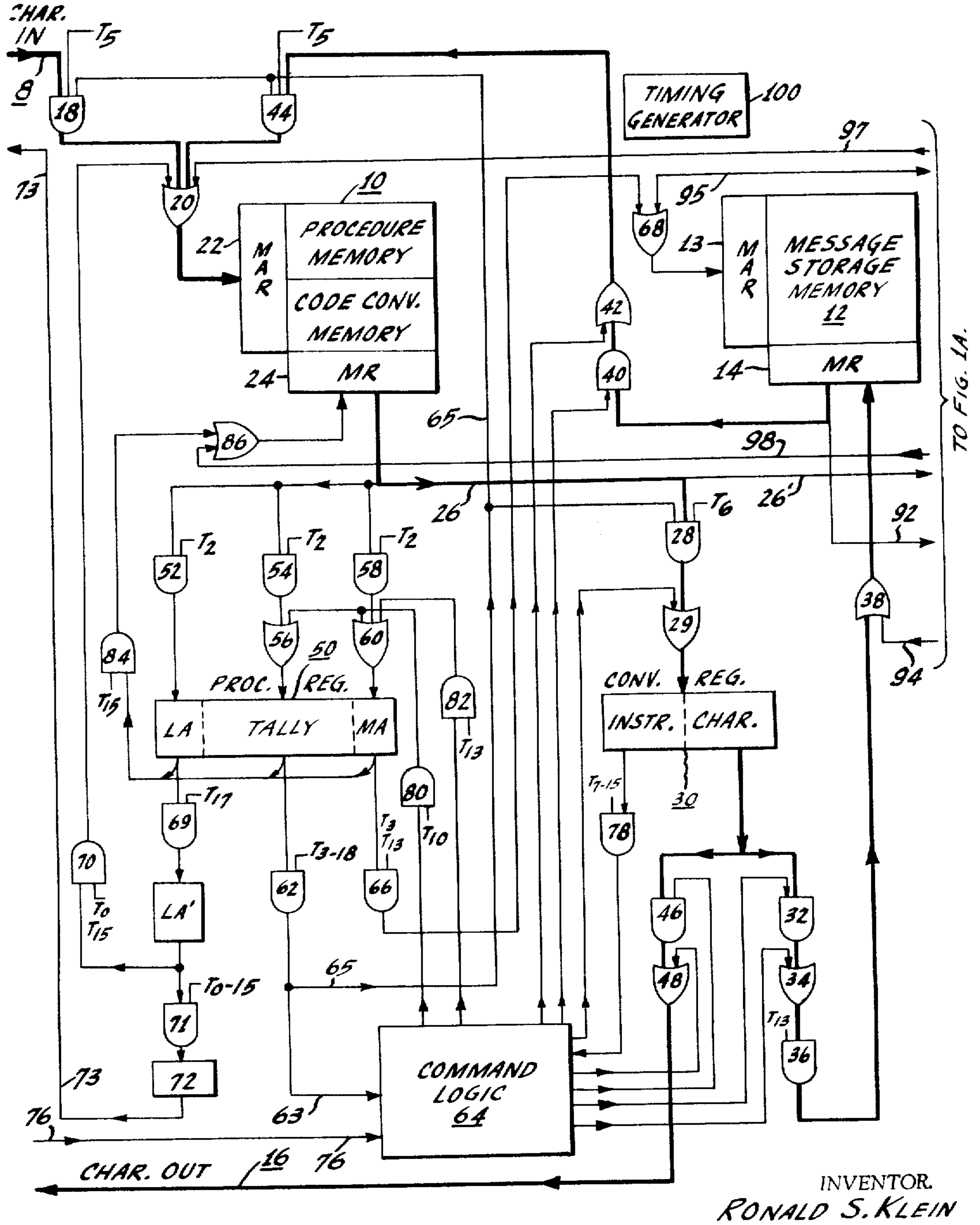
FIG. 1 is a block diagram of a communications accumulation and distribution system for transferring characters between line buffers and a message storage memory.

Referring now in greater detail to FIG. 1, the accumulation and distribution system shown provides for transferring characters appearing on an input line 8 from a plurality of communication channel input buffers (not shown) to corresponding message storage locations in a message storage memory 12. The system also provides for transferring characters from the message storage memory 12 to a character output line 16 connected to a plurality of communication output line buffers (not shown). The characters pass through the system over bus lines drawn thicker than other (control) lines in the drawing. Each character may consist of eight binary bits conveyed by lines including eight separate conductors. The eight-bit characters may represent the usual alphabetic and numeric characters; punctuation marks; symbols; characters for teletype machine operating functions such as space, figures shift, letters shift, line feed, carriage return, etc.; and computer control characters such as start of message high priority, start of message low priority, start of line block, end of line block, end of message, transmission acknowledged, error, request retransmission, end of message; etc.

The accumulation function of the accumulation and distribution unit involves the systematic scanning of all input line buffers and the transferring of characters from the buffers to the message storage memory 12 in such a way as to accumulate messages derived from the buffers in storage zones each of which is reserved for characters from a respective input buffer. Messages accumulated in the message memory 12 are transferred to a communication data processor CDP (not shown). After processing by the CDP, messages are returned to the message storage memory 12. The distribution function of the accumulation and distribution unit involves the transfer of individual characters from the many message zones in the message memory 12 to the respective output line buffers (not shown).

To summarize, the accumulation and distribution unit illustrated in FIG. 1 performs the function of accumulating characters from many input line buffers into message units for processing by a communication data processor, and performs the function of distributing the characters of messages received from the communication data processor to appropriate output line buffers. Stated another way, the accumulation and distribution unit acts as a buffer between a large number of relatively low speed communication channels operating in real time and a relatively very high speed communication data processor.

The component parts of the system may be known conventional "and" gates, "or" gates, registers, decoders, memories, etc. The memories may be conventional random-alcess magnetic core memories.

*Description—Path for incoming characters*

Character input line 8 from input line buffers is connected through gates 18 and 20 to the memory address register (MAR) 22 of a procedure and code conversion memory 10. The memory 10 may be viewed as a single memory which includes a zone of procedure word locations for storing procedure and status information associated with respective input and output lines, and also a zone of conversion word locations for storing code converted data characters and associated machine instructions. Alternatively, the memory 10 may be viewed as a procedure memory and a conversion memory both served by a common memory address register (MAR) and a common memory register (MR). Separate registers can be employed if desired.

An input character supplied as an address to the memory address register 22 to the memory 10 causes the addressing of a word in the conversion zone of the memory and the appearance of a code converted word in the memory register 24. The memory register 24 is connected over a line 26 and through gate means 28 and 29 to a conversion word register 30. The gate means 28 permits the transfer of only selected portions of the conversion word in the memory register 24 to the conversion register 30. The selected portions of the conversion word includes a code converted character portion which is directed to the character stages CHAR of the register 30, and an associated machine instruction portion which is directed to the stages INSTR of the register 30. The character from register 30 is directed through gates 32, 34, 36 and 38 to the memory register 14 of the message storage memory 12.

*Description—Path for outgoing characters*

The path for characters in the reverse direction from the memory register 14 of the message storage memory 12 includes the gates 40, 42, 44 and 20 to the memory address register 22 of the procedure and code conversion memory 10. Code converted characters from the memory 10 leave the memory register 24 over line 26 and pass through gate means 28 and 29 to conversion register 30, from which they pass through gates 46 and 48 to the character output line 16.

As has been described, the paths followed by characters entering and leaving the system include the code conversion zone of the procedure and code conversion memory 10. The flow of characters is controlled by procedure information stored in the procedure zone of the same procedure and code conversion memory 10. The two zones of the memory 10 are employed during alternating time periods, the procedure zone of the memory being used to determine the procedures followed during the next following time period when a character passes through the memory 10 and is code converted by the memory.

*Description—Controls for flow of characters*

The procedure or control part of the system will now be described starting with the procedure memory 10 which has a procedure zone of storage locations from which a procedure word can be read to the memory register 24. The stages in memory register 24 employed for line buffer addresses are connected through a gate 52 to the line address stages LA of a procedure register 50; the stages of memory register 24 allocated to procedure and status tally information are coupled through gates 54 and 56 to the stages TALLY of the register 50; and the stages of memory register 24 allocated to message storage memory addresses are coupled through gates 58 and 60 to the message address stages MA of the register 50.

Stages TALLY of procedure register 50 are connected through gate 62 and line 63 to a command logic unit 64, and are connected over line 65 to gate means 28 and to gates 44 and 18. The memory address stages MA of procedure register 50 are connected through gates 66 and 68 to the memory address register 13 of message storage memory 12. The line address stages LA of procedure register 50 are connected through a gate 69 to line address stages LA′. The stages LA′ are connected through gates 70 and 20 to the memory address register 22. The stages LA′ are also connected through a gate 71 to an address decoder 72 having an output line 73 connected to the line buffers. The output line 73 has separate conductors connected to as many respective input and output line buffers as there are to be serviced. A "ready-to-be-serviced" line 76 is connected from the input and output line buffers to the command logic unit 64.

The command logic unit 64 also receives information corresponding with the contents of the stages INSTR of the conversion register 30 through a gate 78. The command logic unit 64 supplies signals through a gate 80 to gates 56 and 60, supplies signals through a gate 82 to the gate 60, and supplies signals to gates 32, 34, 46 and 48. All of the stages of the procedure register 50 are connected through gates 84 and 86 to the memory register 24 of memory 10 for the purpose of rewriting the contents, after modification, of the procedure register 50 back into the memory 10.

FIG. 1A includes a computer interrupt logic unit 90 for controlling the flow of message characters between the message storage memory 12 in FIG. 1 and the communication data processor CDP computer (not shown). The unit 90 has an output connected to enable gate 91 to pass message characters over line 92 from the message memory 12 to the communication data processor, and an output connected to enable gate 93 to pass message characters over line 94 from the communication data processor to the message memory 12. Another output 95 of the logic unit 90 is connected through gate 68 (in FIG. 1) to the memory address register 13 of the message memory 12 to determine the addresses of message characters transferred from the message memory or transferred to the message memory.

The computer interrupt logic unit 90 also permits accessing of the procedure and code conversion memory 10 by the communication data processor. An output of logic unit 90 is applied through gate 96 (FIG. 1A), line 97 and gate 20 (FIG. 1) to the memory address register 22 of the procedure and code conversion memory 10. An output 98 (FIG. 1A) of the logic unit 90 is connected through gate 86 (FIG. 1) to the memory register 24 of the procedure and code conversion memory 10. The memory register 24 (FIG. 1) is connected to convey procedure and conversion words over lines 26, 26′ and a gate 99 (FIG. 1A) to the computer interrupt logic unit 90.

Figure 3:
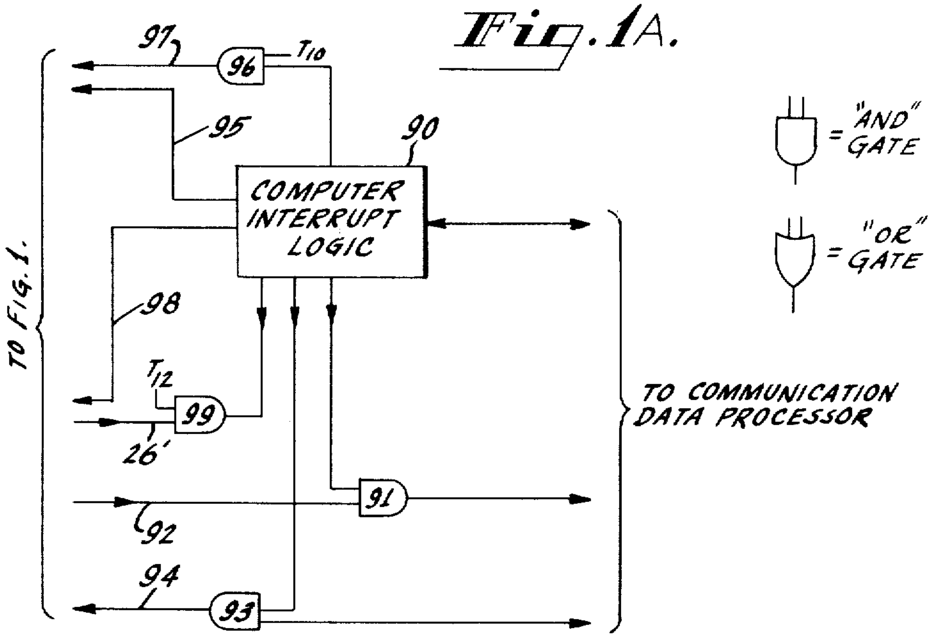
FIG. 3 is a timing diagram which will be referred to in describing the operation of the system of FIGS. 1, 1A and 2.
Figure 3:
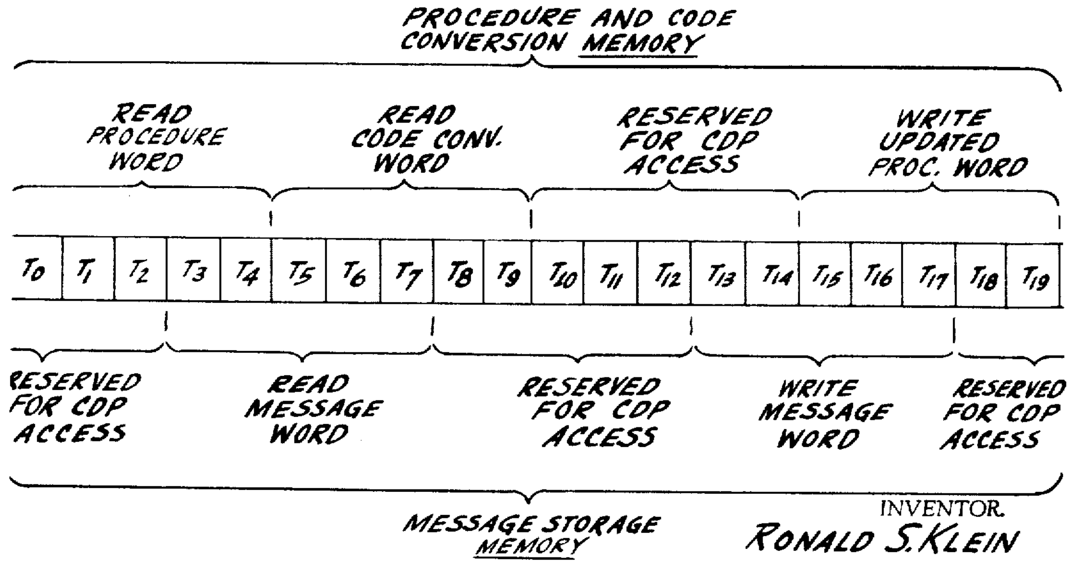

A timing generator 100 shown in FIG. 1 supplies appropriate timing pulses, as illustrated in FIG. 3, to the gates shown in FIGS. 1 and 1A at the times indicated on the individual gates.

Figure 2:
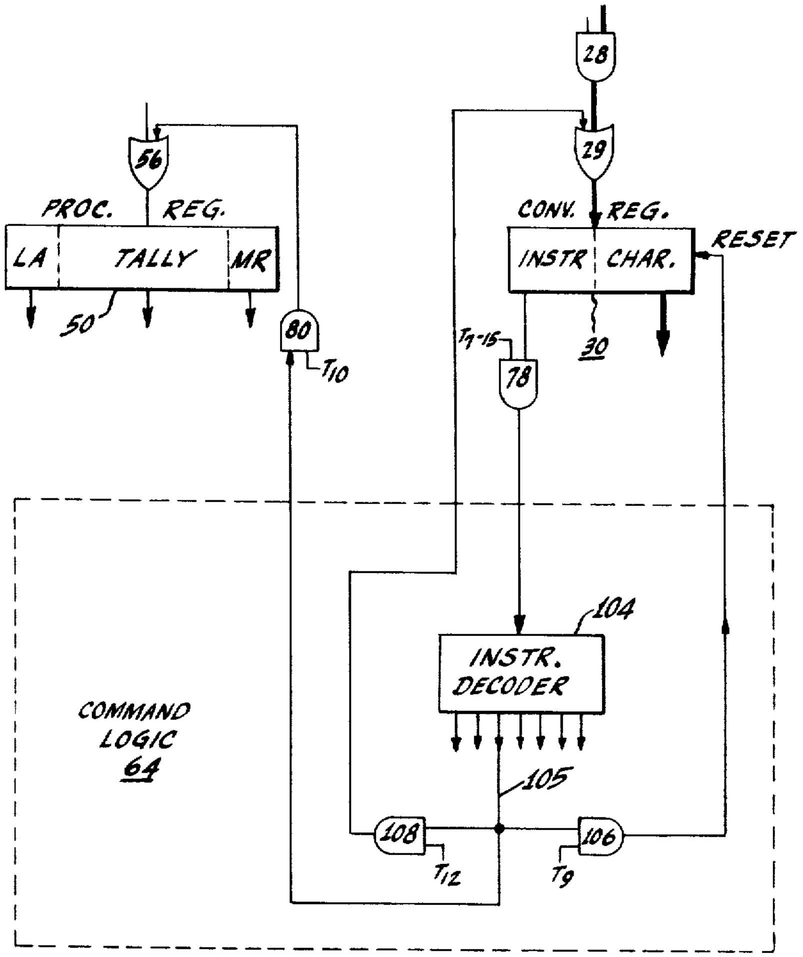
FIG. 2 is a diagram of a part of the system of FIG. 1 with a portion thereof shown in greater detail.

FIG. 2 shows a portion of the system illustrated in FIG. 1 with the command logic unit 64 amplified to include means for performing an illustrative one of its many functions. The stages INSTR of register 30 are connected through the gate 78 to instruction decoder 104. One of the outputs 105 of the decoder 104 is connected through a gate 106 to a reset input of the stages CHAR of register 30, is connected through a gate 108 and the gate 29 to the stages CHAR of register 30, and is connected through the gates 80 and 56 to the stages TALLY of procedure register 50.

FIG. 3 is a timing chart showing timing pulses $T_0$ through $T_{19}$ supplied by the timing generator 100 of FIG. 1 to correspondingly-designated inputs of gates during one complete cycle of operation of the system of FIGS. 1, 1A and 2. The timing chart of FIG. 3 will be referred to in describing the operation of the system.

*Operation—Conditioning system for incoming character*

The operation of the system of FIG. 1 will now be described. It will be assumed that the system is at the beginning $T_0$ of a timing cycle as illustrated in FIG. 3. During the preceding cycle, at time $T_{17}$, gate 69 was enabled to direct a line buffer address from stages LA of the procedure register 50 to the stages LA'. At time $T_0$ of the cycle being described, the gate 70 is enabled to pass the line buffer address from stages LA' to the memory address register 22 to address the word location in the procedure zone of memory 10 which corresponds with the line buffer to be serviced. Starting at the same time $T_0$, and continuing until time $T_{15}$, the gate 71 is enabled to pass the line buffer address to the decoder 72. This results in the energization of the one of the conductors of the decoder output line 73 which is connected to the line buffer about to be serviced. At time $T_1$ the addressed procedure word in memory 10 is read into the memory register 24. At time $T_2$ the gates 52, 54 and 58 are enabled to transfer the procedure word to the stages LA, TALLY and MA of the procedure register 50.

To summarize, at time $T_2$, the stages LA of the procedure register 50 contain the address which identifies the next line buffer to be serviced, the stages LA' contain the address of the line buffer being serviced, and the stages TALLY and MA contain all the information concerning the energized input line that is necessary for controlling the transfer of a character from the energized input line buffer to an appropriate place in the message storage memory 12 where a message from the presently energized input line is being accumulated. The stages MA contain the address in the message storage memory 12 where the character in the presently energized input line buffer is to be stored.

The stages TALLY contain information concerning the energized input line, such as, the code conversion and procedure mode to be followed with that particular line or channel, whether the message is continuous or has pauses between blocks, the number of characters and character blocks which have already been transferred from the input line to the message memory 12, that a previously received character was in error so that a retransmission is required, whether the buffer is an input or an output buffer, parity information for error checking, operating speed range of the particular line channel, whether or not acknowledgment is required by the distant transmitting location, channel coordination and data transmission conditions requiring action by the communication data processor, the number of times a retransmission has occurred as the result of an error, etc.

At time $T_{3-18}$ the contents of the TALLY portion of procedure register 50 is conveyed through the gate 62 and over line 65 to enable the input gate 18, and to gate means 28 to determine the portion of the code conversion word which should be used for the input character about to be received from the input line buffer. The TALLY information is also supplied over line 63 to decoders in the command logic unit 64. Appropriate controls are supplied from command logic unit 64 to permit the subsequent passage of the code converted character from the conversion register 30 through gate 32. The command logic unit 64 also operates, at later times $T_{10}$ and $T_{13}$ to supply signals through gates 80 and 82 which modify and update the contents of the procedure register 50 before the contents are rewritten at time $T_{15}$ back into the procedure memory 10.

*Operation—System handling of incoming character*

The system is now ready, at time $T_5$, to receive the character from the input line buffer, code convert the received character to the corresponding character in a standard computer code used in the communication data processor, and direct the code converted character to the appropriate character storage location in the area where the message from the particular line is being accumulated in the message memory 12. The character from the energized input buffer may be in any one of several codes such as are used by data processing and communications equipments made by various manufacturers. The input character is directed through enable gate 18 and gate 20 to the memory address register 22 where the character constitutes the address of a code conversion and instruction word in the code conversion zone of the procedure and code conversion memory 10. The addressed code conversion word in the memory 10 includes corresponding versions of the input word in a number of different codes. The particular code into which the input character is to be converted is selected from those available in the word. This selection is performed at time $T_6$ by the gate means 28 in accordance with the information previously supplied to it from the stages TALLY of the procedure register 50. All incoming characters from input line buffers are converted to a code suitable for use in the communications data processor CDP. (As will later be described, all outgoing characters from the CDP to output line buffers are converted from the CDP code to a code appropriate to the particular output line buffer. In some cases, the line buffer may use the same code as the CDP.)

The portion of the conversion word actually transferred from the memory 10 to the conversion register 30 includes the desired code converted character which is directed to the stages CHAR of the register, and an associated machine instruction which is directed to the stages INSTR of the register. The machine instruction portion of the contents of register 30 is directed, during time $T_{7-15}$, through gate 78 to the command logic unit 64.

Decoding hardware in the command logic unit 64 is arranged to perform necessary control functions appropriate to the particular associated code converted character. If the code converted character is an alphabetic, numeric, punctuation or other valid character, the associated machine instruction controls the forwarding of the character to the message storage memory 12 by enabling gate 32. If the code converted character is a functional character such as an acknowledgment character, a request for repeated transmission, an error, a start of message, a start of line block, an end of line block, an end of message, or other character requiring the performance of some control function, or requiring the modifying or updating of the tally word in the tally register 50, the decoding hardware in unit 64 initiates or performs the necessary control functions. The associated functional or control character in stages CHAR may or may not be forwarded through gates 32, 34, 36 and 38 to the message memory 12, depending on whether it is recognized by the command logic unit 64 as being needed by the communication data processor.

FIG. 2 will be referred to for the purpose of describing the operation of the conversion register 30 and the command logic unit 64 when an invalid or unassigned character happens by error to be applied to the register 30. The invalid or unassigned character in the stages CHAR of register 30 has an associated machine instruction in the stages INSTR of the register which indicates that the character is an invalid or unassigned character. The machine instruction is directed through gate 78 to an instruction decoder 104 in the command logic unit 64. The machine instruction causes one output line 105 of the decoder 104 to be energized. The decoded signal on line 105 is applied at time $T_9$ through gate 106 to reset the stages CHAR of register 30. The decoded signal is also applied at time $T_{12}$ through gates 108 and 29 to insert a predetermined error-indicating character into the stages CHAR of the register 30.

The decoded signal on line 105 is also applied at time $T_{10}$ through gates 80 and 56 to an error-indicating one of the stages TALLY of procedure register 50. The error-indicating bit in the register 50 now constitutes part of the procedure word associated with the line buffer channel being serviced. The procedure word is later returned to the procedure and word conversion memory 10 for use on future occasions when the particular line buffer channel is serviced. The procedure word associated with the line buffer channel thus contains a record of the fact that an invalid character was received at a previous time from that particular line buffer.

After a predetermined number of characters constituting a block of characters has been received from the line buffer, the machine will examine the error-indicating bit in the procedure word and may request retransmission of the block of characters. Alternatively, the machine may be in a communication mode in which complete messages are forwarded to the destination without requesting a retransmission. In this case, the forwarded message includes an error-indicating character in place of the invalid character received. The error-indicating character, which was supplied by gate 108 to the stages CHAR of register 30, is directed from register 30 through gates 32, 34, 36 and 38 (FIG. 1) at time $T_{13}$ to the message storage memory 12 via its memory register 14.

The instruction decoder 104 in FIG. 2 has a number of other outputs each corresponding with a different machine instruction from stages INSTR of register 30. These other outputs of the instruction decoder 104 are employed to perform other control functions appropriate to the particular character in the stages CHAR. The one control function described in connection with the output 105 of the decoder 104 is illustrative of the many other different control functions performed as a result of the decoding of the contents of the stages INSTR.

In the present arrangement, the code converted character in the stages CHAR of the register is not decoded for the performance of control functions. Rather the instruction bits associated with the character are decoded. The arrangement permits greater flexibility in the use of the system because the codes employed may be changed without requiring changes in the decoding hardware. When changes in the codes are desired, it is merely necessary to store appropriate instruction bits in the code conversion memory for each converted character in the new code. Appropriate instruction bits will be those for which the decoding hardware was originally designed. Then the control functions associated with respective code converted characters are performed by the existing wired hardware.

*Operation—Updating control information*

The description of the operation of the system of FIG. 1 has proceeded to the point where one character from one input line buffer has been transferred through gate 36 at time $T_{13}$ to a zone in the message storage memory 12 where a message from the energized input line buffer is being accumulated. The stages TALLY and MA of the procedure register 50 have been or are concurrently updated to reflect the fact that an additional character of the message has been accumulated. The updating includes the changing of bits in the stages MA of the procedure register 50 to insure that the next following character received on the input line will be stored at the next following storage location in message memory 12 for the message being accumulated. The updating of the tally register 50 also provides for any required different handling or procedure to be followed when the next character is received from the same input line buffer.

The updated procedure word in the procedure register 50 is directed, at time $T_{15}$, through the gates 84 and 86 to the memory register 24 from which the procedure word is rewritten back into the procedure memory 10 in the same storage location that it previously occupied and which is reserved for controlling characters from the line buffer which has just been serviced. The line buffer address for the next line buffer to be serviced remains in the stages LA until time $T_{17}$ when gate 69 is enabled and the address is transferred to the stages LA′.

*Operation—Conditioning system for outgoing character*

The line address stages LA′ following time $T_{17}$ contain information bits constituting the address or identifying number of the next following line buffer to be serviced. These address bits are now directed, at time $T_0$ of the next following cycle, through gate 71 to the line buffer address decoder 72. The line buffer address decoder decodes the line buffer address bits and sends an energizing signal level over the selected one of the conductors of line 73 to the addressed line buffer to be serviced. The line buffer address is also directed from stages LA′ at time $T_0$ through gates 70 and 20 to the memory address register 22 of procedure memory 10.

The next line buffer which has now been addressed for servicing is assumed to be an output line buffer, although it could be another input line buffer. The sequence in which both input and output line buffers are serviced is entirely flexible and may be adapted for changing traffic load conditions by merely modifying the line buffer address bits in the memory which determine the next line buffer serviced in each stored procedure word. If the buffer addressed is an output line buffer selected by one of the conductors of line 73 from the line buffer address decoder 72, the output line buffer will be serviced provided that it responds with a signal over line 76 to the command logic unit 64 indicating that it is empty and available to receive a character. If the output buffer is available, and if other conditions are met, the command logic unit 64 will, at later appropriate times, enable gates 40 and 46 to permit the passage of a character from the message memory 12 through the character output line 16 to the output buffer.

At the time $T_0$ in the second operating cycle being described, the procedure memory 10 is addressed for the procedure word containing procedure and status information associated with the particular output buffer about to be serviced. The addressed procedure word is read from memory 10 into memory register 24 and is directed at time $T_2$ through gates 52, 54, 56, 58 and 60 to the procedure register 50. The bits in the memory address stages MA of register 50 are directed at time $T_3$ through gates 66 and 68 to the memory address register 13 of the message storage memory 12. Information bits in the stages TALLY of procedure register 50 are directed at time $T_{3-18}$ through gate 62 and over line 65 to enable outgoing character gate 44, and to condition gate means 28 to pass the particular desired portions of the code conversion word stored in memory 10 that should be utilized for the particular output line buffer being serviced. Signals from gate 62 are also supplied over line 63 to the command logic unit 64 to control appropriate functions of the system and the subsequent updating of the contents of stages TALLY and MA of the procedure register 50.

*Operation—System handling of outgoing character*

The system now ready at time $T_3$, for the transfer to the addressed output line buffer of an addressed character forming part of a message stored in message memory 12 in an area reserved for the addressed output line buffer. The addressed character in the message memory 12 is read out, at time $T_5$, through the memory register 14, gates 40, 42, 44 and 20 to the memory address register 22 of memory 10. The character supplied to the memory address register 22 is in the code used by the communications data processor CDP. The character constitutes the address of a corresponding conversion word in the conversion zone of memory 10. The addressed conversion word in memory 10 is read into the memory register 24 and directed over line 26 to the gate means 28. The conversion word includes corresponding characters in a number of different codes, and a corresponding machine instruction. The gate means 28 is enabled at time $T_6$ to select from the conversion word only the one character in the code specified for the particular output line buffer.

The character in the appropriate converted code is directed to the stages CHAR of register 30 and the machine instruction associated with the code converted character is directed to the stages INSTR of the register 30. The character in stages CHAR is directed through gates 46 and 48 and the character output line 16 to the output line buffer being serviced. This transfer of the character is performed under the control of the command logic unit 64 in response to its receipt of machine instruction information through gate 78 from stages INSTR of register 30.

*Operation—Updating control information*

After the character has been transferred to the output line buffer, the stages TALLY and MA of procedure register 50 are appropriately updated under the control of the command logic unit 64. The contents of the procedure register 50 is then, at time $T_{15}$, rewritten back into its original location, addressed by the contents of stages LA′, in the procedure and code conversion memory 10. Thereafter, at time $T_{17}$, the address of the next line buffer to be serviced is transferred from the line address stages LA of register 50 to stages LA′. The next line buffer address remains in stages LA′ of register 50 for use at time $T_0$ of the next following or third cycle of operation in selecting the next following line buffer to be serviced.

The operation then repeats in a cyclical manner so that all of the input and output line buffers are periodically serviced. The timing is designed to service all buffers as frequently as is necessary considering the low operating speeds of the communication line equipments and their real time operating conditions.

During each cycle of operation, such as the two cycles which have been described, there are time periods shown in FIG. 3 which are reserved for access to the two memories 10 and 12 by the communication data processor CDP (not shown). The CDP can access the procedure memory during times $T_{10}$ through $T_{14}$ and can access the conversion memory 12 during times $T_8$ through $T_{12}$ and $T_{18}$ through $T_2$. Accessing of the memories is accomplished by the computer interrupt logic and gates shown in FIG. 1A. Accessing the procedure memory by the CDP may be done for the purpose of using or changing the procedure and conversion words stored therein. Accessing the message storage memory is done for the purpose of transferring message words to or from the CDP.

What is claimed is:

1. An accumulation unit for transferring data characters from a plurality of input lines to a corresponding plurality of message storage zones in a message storage memory, comprising a procedure memory having addresses (identifying respective input lines) for corresponding procedure word storage locations, means to cyclically address all of said procedure word locations, a code conversion memory having addresses (identifying characters in at least one character code) for corresponding conversion word storage locations containing equivalent characters in another code, a procedure register and a conversion register connected to receive information read in sequence from said procedure and conversion memories, respectively, means using the contents of said procedure register to address an input line and a word location in said message storage memory, a first decoder means responsive to the contents of said procedure register to condition a character signal path from the input lines to the address input of said conversion memory, and to condition a character signal path from said conversion memory to said conversion register, a second decoder means to decode the contents of the conversion register and condition a character signal path from the conversion register to the addressed location in said message storage memory, and means to modify and update the contents of said procedure register and write it back into said procedure memory.

2. A distribution unit for transferring data characters to a plurality of output lines from a corresponding plurality of message storage zones in a message storage memory, comprising a procedure memory having addresses (identifying respective output lines) for corresponding procedure word storage locations, means to cyclically address all of said procedure word locations, a code conversion memory having addresses (identifying characters in at least one character code) for corresponding conversion word storage locations containing equivalent characters in another code, a procedure register and a conversion register connected to receive information read from said procedure and conversion memories, respectively, means using the contents of said procedure register to address an output line and a word location in said message storage memory, a first decoder means responsive to the contents of said procedure register to condition a character signal path from an addressed location in said message storage memory to the address input of said conversion memory, and to condition a character signal path from said conversion memory to said conversion register, a second decoder means to decode the contents of the conversion register and condition a character signal path from the conversion register to the output lines, and means to modify and update the contents of said procedure register and write it back into said procedure memory.

3. An accumulation and distribution unit for transferring data characters between a plurality of input and output lines and a message storage memory comprising a procedure memory having addresses (identifying respective input and output lines) for corresponding procedure word storage locations, means to cyclically address all of said procedure word locations, a code conversion memory having addresses (identifying characters in at least one character code) for corresponding conversion word storage locations containing equivalent characters in another code, a procedure register and a conversion register connected to receive information read from said procedure and conversion memories, respectively, means using the contents of said procedure register to address a line and a word location in said message storage memory, a first decoder means responsive to the contents of said procedure register to condition a character signal path from the input lines or an addressed location in said message storage memory to the address input of said conversion memory, and to condition a character signal path from said conversion memory to said conversion register, a second decoder means to decode the contents of the conversion register and condition a character signal path from the conversion register to the addressed location in said message storage memory or to the output lines, and means to modify and update the contents of said procedure register and write it back into said procedure memory.

4. An accumulation and distribution unit for transferring data characters between a plurality of input and output line buffers and a corresponding plurality of message storage zones in a message storage memory, comprising a procedure memory having addresses (identifying respective input and output line buffers) for corresponding procedure word storage locations, each of said procedure words including the address of the procedure word of the next line buffer to be serviced, procedure and status tally information, and a message storage memory address, means to cyclically address all of said procedure word locations using the address of the next procedure word in each procedure word for determining the next procedure word addressed, a code conversion memory having addresses (identifying characters in at least one character code) for corresponding conversion word storage locations containing equivalent characters in another code, a procedure register and a conversion register connected to receive information read from said procedure and conversion memories, respectively, means using the line buffer address and message memory address contents of said procedure register to address a line buffer and a word location in said message storage memory, a first decoder means responsive to the tally contents of said procedure register to condition a character signal path from the input line buffers or an addressed location in said message storage memory to the address input of said conversion memory, and to condition a character signal path from said conversion memory to said conversion register, and a second decoder means to decode the contents of the conversion register and condition a character signal path from the conversion register to the addressed location in said message storage memory or to the output line buffers.

5. An accumulation and distribution unit for transferring data characters between a plurality of input and output line buffers and a corresponding plurality of message storage zones in a message storage memory, comprising a procedure memory having addresses (identifying respective input and output line buffers) for corresponding procedure word storage locations, means to cyclically address all of said procedure word locations, a code conversion memory having addresses (identifying characters in various character codes) for corresponding conversion word storage locations containing equivalent characters in other codes together with associated machine instructions, a procedure register and a conversion register connected to receive information read from said procedure and conversion memories, respectively, means using the contents of said procedure register to address a line buffer and a word location in said message storage memory, and to condition a character signal path from the input line buffers or an addressed location in said message storage memory to the address input of said conversion memory, and to condition a character signal path from said conversion memory to said conversion register for a code converted character in one selected code and an associated machine instruction, and decoder means to decode the machine instruction portion of the contents of the conversion register and condition a character signal path from the character portion of the conversion register to the addressed location in said message storage memory or to the output line buffers.

6. A communications accumulation and distribution unit for transferring data characters between a plurality of input and output line buffers and a corresponding plurality of message storage zones in a message storage memory, comprising a procedure memory having addresses (identifying respective input and output line buffers) for corresponding procedure word storage locations, each of said procedure words including the address of the procedure word of the next line buffer to be serviced, procedure and status tally information, and a message storage memory address, means to cyclically address all of said procedure word locations using the address of the next procedure word in each procedure word for determining the next procedure word addressed, a code conversion memory having addresses (identifying characters in various character codes) for corresponding conversion word storage locations containing equivalent characters in other codes together with associated machine instructions, a procedure register and a conversion register connected to receive information read from said procedure and conversion memories, respectively, means using the line buffer address and message memory address contents of said procedure register to address a line buffer and a word location in said message storage memory, a first decoder means responsive to the tally contents of said procedure register to condition a character signal path from the input line buffers or an addressed location in said message storage memory to the address input of said conversion memory, and to condition a character signal path from said conversion memory to said conversion register for a code converted character in one selected code and an associated machine instruction, a second decoder means to decode the machine instruction portion of the contents of the conversion register and condition a character signal path from the character portion of the conversion register to the addressed location in said message storage memory or to the output line buffers, and means to modify and update the tally and message storage memory address contents of said procedure register and write it back into said procedure memory.

7. A communications accumulation and distribution unit for transferring data characters between a plurality of input and output line buffers and a corresponding plurality of message storage zones in a message storage memory, comprising a code conversion memory having a memory register and having a memory address register for addresses (identifying characters in various character codes) corresponding with conversion word storage locations containing equivalent characters in another code, a conversion register connected to receive information read from the memory register of said conversion memory, means to address a line buffer and a word location in said message storage memory, means to condition a character signal path from the input line buffers or an addressed location in said message storage memory to the memory address register of said conversion memory, and to condition a character signal path from the memory register of said conversion memory to said conversion register, and decoder means to decode the contents of the conversion register and condition a character signal path from the conversion register to the addressed location in said message storage memory or to the output line buffers.

8. A communications accumulation and distribution unit for transferring data characters between a plurality of input and output line buffers and a corresponding plurality of message storage zones in a message storage memory, comprising a code conversion memory having a memory register and having a memory address register for addresses (identifying characters in various character codes) corresponding with conversion word storage locations containing equivalent characters in other codes together with associated machine instructions, a conversion register connected to receive information read from the memory register of said conversion memory, means to address a line buffer and a word location in said message storage memory, means to condition a character signal path from the input line buffers or an addressed location in said message storage memory to the memory address register of said conversion memory, and to condition a character signal path from the memory register of said conversion memory to said conversion register for a code converted character in one selected code and an associated machine instruction, and decoder means to decode the machine instruction portion of the contents of the conversion register and condition a character signal path from the character portion of the conversion register to the addressed location in said message storage memory or to the output line buffers.

References Cited by the Examiner

UNITED STATES PATENTS

| | | | |
|---|---|---|---|
| 3,061,192 | 10/1962 | Terzian | 235—157 |
| 3,063,036 | 11/1962 | Reach et al. | 340—172.5 |
| 3,142,043 | 7/1964 | Schrimpf | 340—172.5 |
| 3,200,380 | 8/1965 | MacDonald et al. | 340—172.5 |
| 3,202,972 | 8/1965 | Stafford et al. | 340—172.5 |
| 3,229,259 | 1/1966 | Barker et al. | 340—172.5 |

ROBERT C. BAILEY, *Primary Examiner.*

R. M. RICKERT, *Assistant Examiner.*